United States Patent [19]

Taylor

[11] Patent Number: 5,051,184
[45] Date of Patent: Sep. 24, 1991

[54] IMMOBILIZED ENZYME CATALYZED REMOVAL OF AROMATIC COMPOUNDS FROM AQEUOUS SOLUTIONS

[75] Inventor: Keith E. Taylor, Windsor, Canada

[73] Assignee: Biotech Environmental, Inc., Hamilton, Canada

[21] Appl. No.: 573,790

[22] Filed: Aug. 28, 1990

[51] Int. Cl.$^5$ .............................................. C02F 1/54
[52] U.S. Cl. .................................. 210/632; 210/638; 210/759; 210/728; 210/909; 435/177
[58] Field of Search ............ 210/721, 723, 728, 632, 210/759, 909, 638, 729; 530/395; 435/810, 188, 6, 177

[56] References Cited

U.S. PATENT DOCUMENTS 4,623,465 11/1986 Klibanov .............................. 210/632
4,874,813 10/1989 O'Shannessy ........................ 530/395

FOREIGN PATENT DOCUMENTS 0914508 3/1982 U.S.S.R. ............................... 210/632

OTHER PUBLICATIONS

Science, vol. 221, 259–261 (1983), Jul. 1983.
Klibanov, National Technical Information Service, PB84-138155, 1–18 (1983), Jul. 1983.
Detoxicating Hazard Waste (Symp. 1981), edited by J. H. Exner, Ann Arbor Sci. (Publisher), CA 98(12):95130c (1982).
Atlow et al., Biotechnology and Bioengineering, vol. XXVi, pp. 599–603 (1984).
Klivanov, et al., Enzyme and Microbiol. Technol. 3(2), 119–122 (1981).
Klibanov, A. M., Enzyme Engineering 6, 3(2), 319–325 (1982).
Klibanov, A. M. et al., Journal of Applied Biochemistry 2, 414–421 (1980), Nov.

Primary Examiner—Robert A. Dawson
Assistant Examiner—Ana Fortuna
Attorney, Agent, or Firm—Ian C. McLeod

[57] ABSTRACT

A process for the removal of aromatic compounds from aqueous solutions using an oxidatic enzyme, such as a peroxidase enzyme, is described. The enzyme is immobilized on a surface so that preferably multiple passes of the aqueous solution with the aromatic compound can be made over the immobilized enzyme. Higher enzyme utilization with a lower oxidative substrate, such as hydrogen peroxide, requirement is achieved.

28 Claims, 2 Drawing Sheets

IMMOBILIZED ENZYME CATALYZED REMOVAL OF AROMATIC COMPOUNDS FROM AQEUOUS SOLUTIONS

BACKGROUND OF THE INVENTION (1) Field of the Invention

The present invention relates to an improved process for the precipitation of aromatic compounds from an aqueous solution using an enzyme. In particular, the present invention relates to a process wherein the enzyme is immobilized on a surface so as to cause the precipitation of the aromatic compound in the solution.

(2) Prior Art

Aromatic organic compounds are found in aqueous solution or suspension in groundwater, in settling ponds associated with public water purification or industrial facilities and in industrial effluents. The latter frequently derive from processes involving the combustion or transformation of fossil fuels, from the forest products industry or from the manufacture of explosives, to name a few of many sources. Aromatic compounds in general are toxic, albeit by a variety of mechanisms, and, therefore, are classed as pollutants.

Existing methods for removal of aromatics from aqueous solution are mainly comprised of physical adsorption onto various media, metabolism by various micro-organisms and chemical combustion in the presence of various oxidants. Each of these methods has some or all of the following drawbacks: (a) time consuming; (b) expensive; (c) ineffective in dealing with pollutants at the levels encountered and/or in reducing pollutant levels to those desired; (d) exhibit a temperature sensitivity (therefore, large seasonal variation); and (e) have a narrow specificity with respect to the classes of aromatic compounds amenable to treatment.

Klibanov has proposed an improvement in which an oxidative enzyme, peroxidase, is added to the aqueous solution to be treated along with the enzyme's co-substrate, hydrogen peroxide. This mixture converts susceptible aromatic compounds to radicals which in a subsequent, presumably non-enzymic, step couple with one another leading eventually to the formation of a precipitate. Susceptible aromatics are hydroxy- and amino-substituted compounds with various other substituents such as alkyl, alkoxy, halo and fused aryl. A series of publications and reports from Klibanov and co-workers describe these findings which are also embodied, in part, in U.S. Pat. No. 4,623,465 to Klibanov. The publications are:

(1) Science, Vol. 221, 259-261 (1983);
(2) Klibanov, National Technical Information Service, PB84-138155, 1-18 (1983);
(3) Detoxication Hazard Waste (Symp, 1981), Edited by J. H. Exner, Ann Arbor Sci. (Publisher) CA 98(12):95130c (1982);
(4) Atlow, et al, Biotechnology and Bioengineering, Vo. XXVi, pp599-603 (1984);
(5) Klibanov, et al, Enzyme and Microbiol. Technol. 3(2), 119-22(1981);
(6) Klibanov, A. M., Enzyme Engineering 6, 3(2), 319-325 (1982); and
(7) Klibanov, A. M., et al., Journal of Applied Biochemistry 2, 414-421 (1980).

The specific improvement claimed in the Klibanov patent is the ability of such a system to effect the clearance of compounds which are not substrates of the enzyme as long as there is a good substrate (a hydroxy- or amino-aromatic compound) also present. An extension is that the clearance of a poor substrate is augmented in the presence of a good substrate. There are, however, aspects to this approach which lower its economic feasibility: (a) it requires large amounts of enzyme because the enzyme appears to be progressively inactivated under the reaction conditions; (b) relatively high concentrations of hydrogen peroxide are employed which are themselves inhibitory to the enzyme; (c) the treatment requires 3 to 24 hours for completion; (d) a final filtration or centrifugation step is required to remove the precipitate generated; and (e) each of the pure compounds studied appears to require removal at a different pH.

OBJECTS

It is therefore an object of the present invention to provide a process for the removal of the aromatic compounds using an enzyme which overcomes the aforementioned disadvantages of the prior art process. Further, it is an object of the present invention which is relatively simple and economical. These and other objects will become increasingly apparent by reference to the following description and the drawings.

IN THE DRAWINGS

GENERAL DESCRIPTION

Figure 1:
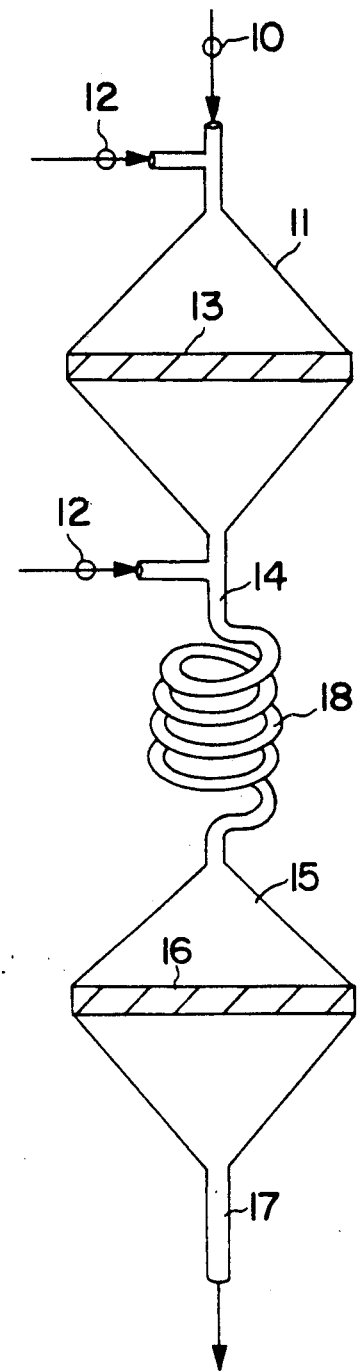
FIG. 1 is a schematic view of a laboratory apparatus of the present invention.

The present invention relates to the process of removing an aromatic organic compound from an aqueous solution by providing an enzyme and a substrate for said enzyme in the aqueous solution to cause the aromatic organic compound to form a precipitate and optionally by adding a hydroxy- or amine-substituted aromatic compound to the aqueous solution to enhance formation of the precipitate of the aromatic organic compound, the improvement which comprises providing the enzyme immobilized on a surface in the solution.

Further the present invention relates to a process for precipitating an aromatic compound from an aqueous solution which comprises: providing an aqueous solution containing an aromatic compound and a substrate for an enzyme; and contacting the aqueous solution with the enzyme which is immobilized on a surface to cause precipitation of the aromatic compound from the solution.

Further still, the present invention relates to a process for precipitating an aromatic compound from an aqueous solution which comprises: providing an aqueous solution containing an aromatic compound and a substrate for an enzyme, wherein the aromatic compound contains at least one substituent in an aromatic ring selected from —NH and —OH; and contacting the aqueous solution in a flowing stream with the enzyme which is immobilized on a surface to cause precipitation of the aromatic compound from the solution.

The enzyme is immobilized on the solid phase using technology known in the fields of affinity chromatography and immunoassays. The linkage is generally covalent via, for example, amide, ester, ether, thioether amine, imine or diazo functional groups. To achieve such covalent attachment, it is usually necessary to activate the solid phase by introduction of appropriate reactive surface functional groups, for example, of the active ester, acid halide, aldehyde, isothiocyanate, cyanate, imidate, alpha-halocarbonyl, oxirane and related types. With respect to enzyme to be attached, the protein's surface carboxyl, amino or phenolic groups are frequently used as attachment sites. If the enzyme is a glycoprotein, it may alternatively be attached via carbohydrate oxidation followed by imine formation with or without simultaneous or subsequent reduction. Other linking strategies involve the formation of electrostatic or hydrophobic complexes.

The enzyme can be immobilized on a surface such as paper or plastic or can be immobilized on beads and like surfaces. Materials used for the solid phase encompass the whole range of polymers with some of the most prevalent being polymers of ethylenically-unsaturated monomers (e.g.-styrene, acrylic acid derivatives, ethylene, propylene), polysaccharides (e.g.-cellulose, dextran agarose), polypeptides (e.g.-gelatin/collagen, cross-linked proteins such as albumin), nylon and glass. Composites of some of the foregoing have also been used as have composites of some of the foregoing with inorganic materials other than silica, such as crystalline calcium phosphate. Preferably the surface is also useful for filtering the precipitated solids from the solution, such as with filter paper. Additional examples include other forms of cellulose, glass fiber filters and other porous solid phases of natural or synthetic occurrence.

In the present invention the enzyme is used in immobilized form and preferably incorporated into a continuous flow reactor so that its contact time with the aromatic compound and peroxide mixture can be controlled by flow rate. In this way the solution can be repeatedly contacted by the enzyme through recycling or by passage through a series of reactor elements on which the enzyme is immobilized. Short contact time prolongs the operating lifetime of the enzyme and, since it is immobilized, therefore it may be used to treat a much greater volume of solution than if it had simply been included in a solution. A laboratory scale reactor is shown in FIG. 1. A production reactor is shown in FIG. 2.

In FIG. 1, line 10 is the inlet waste stream to reactor 11 containing enzyme substrates and non-substrates. Lines 12 are for co-substrate, e.g. hydrogen peroxide, addition to line 10 and then into reactor 11. The immobilized element 13 is provided in reactor 11. FIG. 1 shows a second reactor 15 connected via line 14 and mixing coil 18 to reactor 11 and containing a second immobilized enzyme element 16. There may be more of such reactors in series (not shown). The aqueous stream is removed via line 17 with the enzyme substrates and non-substrates removed. The substrates are hydroxy and amino aromatic compounds. The non-substrates are other organic compounds such as naphthalene and other polycyclic aromatics which are co-precipitated in the presence of the enzyme substrates.

Figure 2:
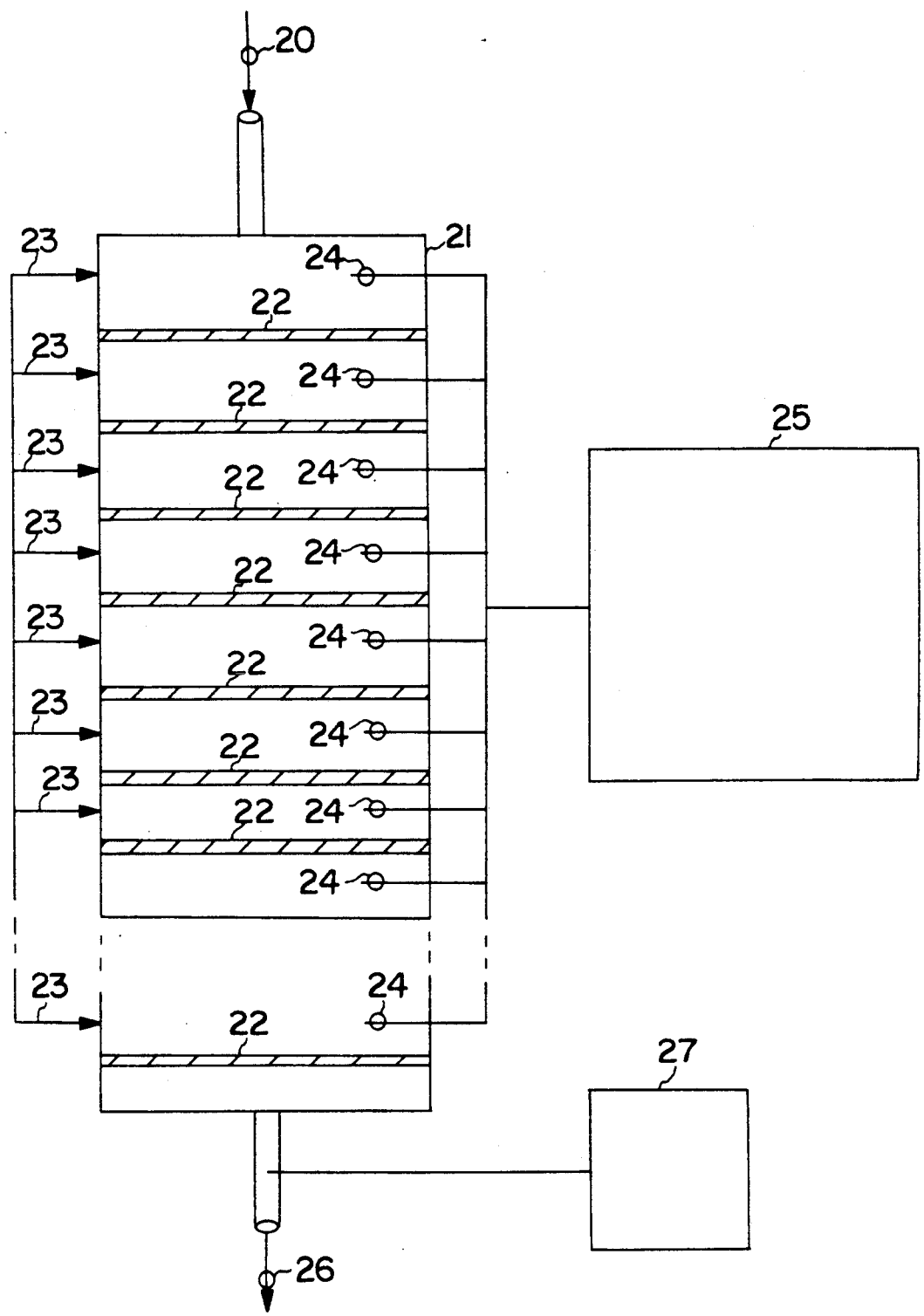
FIG. 2 is a schematic view of a large scale apparatus of the present invention.

In FIG. 2, inlet line 20 is for the waste stream inlet to reactor 21 with multiple immobilized enzyme elements 22. Lines 23 are for co-substrate addition. Sensors 24 are connected to a computer system 25 for monitoring the need for co-substrate addition. The outlet 26 from the reactor 21 includes a second sensor 27 to detect remaining pollutants from the stream to the inlet line 20. The effluent is removed via line 26 and can be recycled or discharged.

The present invention obviates the inhibitory action of elevated hydrogen peroxide concentration in batch processes by carrying out the clearance process at substoichiometric concentrations of peroxide in a flowing stream. The stoichiometric requirement for peroxide is met in this situation by continuously adding it to the mixture between reactor elements or recycles. Under these conditions the immobilized enzyme clears phenol for instance, equally well from solution over the pH range 4 to 8. Lastly collection and removal of the precipitate is addressed in one embodiment of the present invention by allowing the precipitate to accumulate on the filter on which the enzyme is immobilized. Substantial amounts of the precipitate accumulate without drastically decreasing enzyme activity.

The aromatic compounds which can be removed by the present invention, particularly include aromatic amines and hydroxides. Examples are:

| | |
|---|---|
| phenol | aniline |
| 2-chlorophenol | 4-chlorophenol |
| 2,2'-dihydroxybiphenyl | 4,4'-dihydroxybiphenyl |
| 8-hydroxyquinoline | 2-aminophenol |
| 3-aminophenol | 4-aminobiphenyl |
| 4'-amino-2,3'-dimethylazobenzene | benzidine |
| 4-bromoaniline | 4-bromo-2-methylaniline |
| 2-cresol | 3-cresol |
| 4-cresol | 3,3'diaminobenzidine |
| 3,3'-dimethoxybenzidine | 3,3'-dimethylbenzidine |
| 3,3'-dichlorobenzidine | 1,3-diaminobenzene |
| 2,3-dimethylphenol | 2,6-dimethylphenol |
| diphenylamine | 4-fluoroaniline |
| 2-methoxyphenol | 3-methoxyphenol |
| 4-methoxyphenol | 2-methylphenol |
| 5-methylresorcinol | 1-naphthol |
| 1-nitrosonaphthol | 5-nitro-1-naphthylamine |
| 1,4-diaminobenzene | 4-phenylphenol |
| resorcinol | |

The enzymes which can be used are peroxidases, haloperoxidases, lactoperoxidase, ligninases (manganese-dependent or -independent), tyrosinase (also known as polyphenol oxidase) and cytochromes as well as heme proteins such as hemoglobin. Some of the enzymes use oxygen directly as a substrate (e.g. tyrosinase) while others use hydrogen peroxide as an oxidative substrate to activate the enzyme. All are regarded as "oxidative" or "oxidatic" enzymes. Equivalent results can be achieved where oxygen is dissolved in the aqueous solution for oxidative enzymes.

The oxidative substrates for the oxidative enzymes can be oxygen, hydrogen peroxide, various alkyl hydroperoxides such as methyl hydroperoxide and/or percarboxylic acids such as peracetic acid.

Illustrative are the reactions with peroxidase which is a most common and inexpensive enzyme. An example is horseradish peroxidase. Peroxidase in the resting, ferric, state reacts with hydrogen peroxide to undergo a two-electron oxidation to become peroxidase "compound I", which can return to the ferric state (via peroxidase "compound II") by two successive one-electron transfers from aromatic molecules like phenols and anilines. The latter are initially left in their one-electron oxidized forms, i.e., free radicals, which presumably by radical-radical recombinations (there being no evidence of radical chain processes) form dimers. The dimers are themselves phenols/anilines and therefore can be converted to radicals, thereby leading to trimers or tetramers:

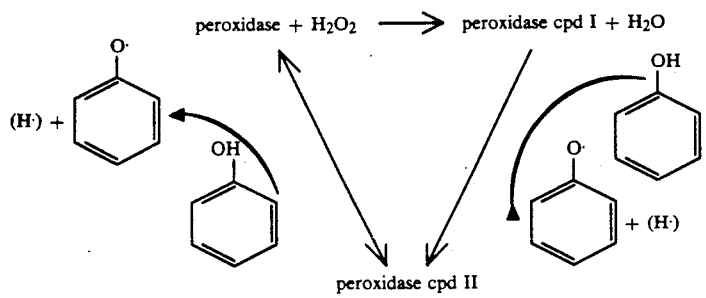
(a second H₂O equivalent is formed from the two formal H-equivalents plus the oxygen atom equivalent put on the ferric enzyme to form compound I)
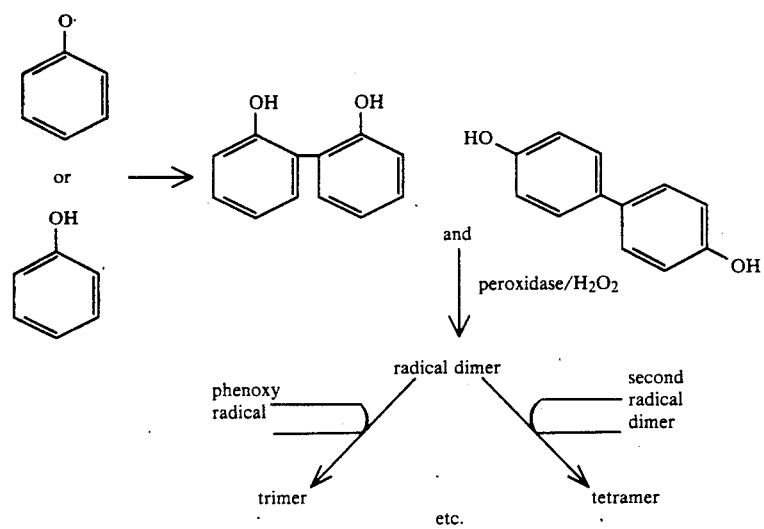
Analogously with anilines:
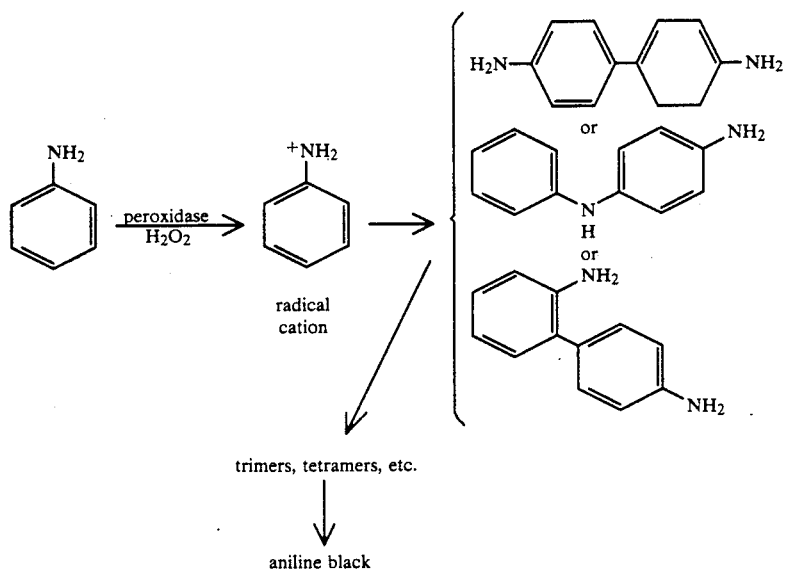

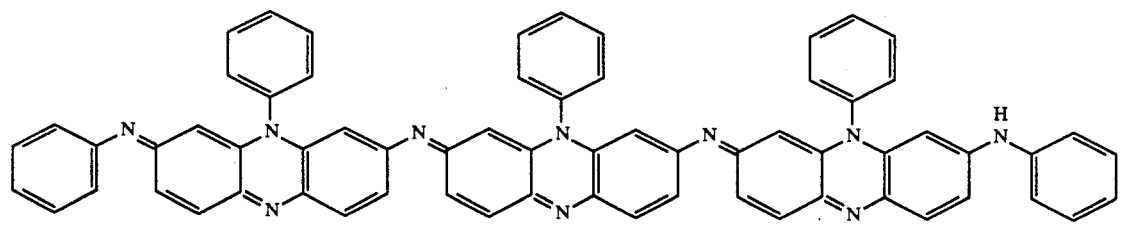

Molecules like naphthalene which are not substrates of the enzyme in its compound I or compound II states are efficiently cleared from aqueous solutions in the presence of molecules, like phenols or anilines, which are. Other examples are benzene, azobenzene, polycyclic aromatic hydrocarbons and polychlorinated biphenyls. One possible mechanism for this could involve radical addition reactions with the enzyme-generated phenoxy/anilinium radicals followed by H-atom abstraction, radical-radical recombination and/or oxidation (e.g. by air) as sketched below:

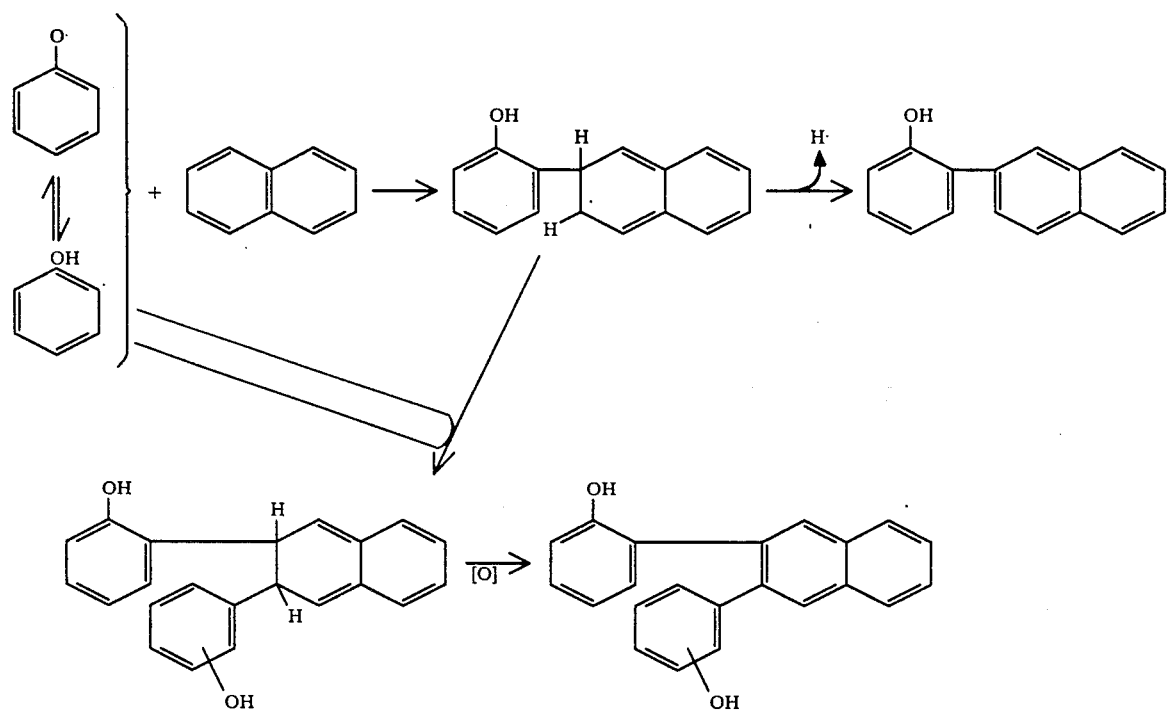

If reactions of this type occur, presumably any type of molecule capable of reacting with a free radical could be a target for enzyme-catalyzed clearance in the presence of phenols/anilines.

Alternatively, the non-substrate molecules can simply be cleared in the presence of substrates (phenols, anilines) by simple occlusion in the oligomers/polymers formed from the latter.

SPECIFIC DESCRIPTION

Example 1

Immobilization of Horseradish Peroxidase on Filter Paper

Filter paper disks (Whatman #41) were treated with 20 mM sodium periodate in 0.1 M acetate buffer of pH 4.7 for 2 hours at room temperature in the dark. The disks were washed with water, then the same acetate buffer and then incubated with 100 mM adipic acid dihydrazide in the same buffer for 3 hours at room temperature. The supernatant was removed and replaced with 50 mM sodium borohydride in 0.2 M carbonate buffer of pH 9.2 and incubated one hour at room temperature. The disks were then washed and transferred to acetate buffer of pH 4.7 for exposure to oxidized enzyme. The latter was prepared by treating a 2 mg/mL solution of horseradish peroxidase (obtained from Boehringer-Mannheim; purity number >3.0) in 0.1M acetate buffer of pH 4.7 with sodium perodate at 6 mM for one hour at room temperature. This solution was dialyzed against acetate buffer to remove perodate and iodate. The enzyme solution above at a dilution of approximately 0.2 mg/mL was incubated with filter paper disks derivatized as above such that approximately 5 to 10 micrograms of enzyme was presented per $cm^2$ of nominal surface area. Typically, 3 to 5 micrograms of enzyme was taken up per $cm^2$ of nominal surface area.

Apparatus for Clearance of Aromatic Compounds From Aqueous Solution

Paper disks of 2.5 cm diameter, prepared as above, were mounted in Swinnex ®-type holders (obtained from Millipore Corp. (Bedford, Mass.); exposed nominal surface area of 3.63 $cm^2$ when mounted in holder).

Aqueous solution containing buffer, aromatic compound and hydrogen peroxide was forced through the filter at flow rates in the 6 to 10 mL/min range using a peristaltic pump. If disks in separate holders were used in series additional hydrogen peroxide was added to the flowing stream between the disks and the combined stream was passed through a mixing coil (as shown in FIG. 1) before encountering the next disk. The decrease in ultra-violet absorbence at the aromatic compound's maximum was used as the criterion for measuring the disappearance of the compound from the aqueous stream.

Phenol Clearance

A solution of phenol at 1.13 mM in 0.1M sodium phosphate buffer of pH 7.5 (50 mL) containing 0.1 mM hydrogen peroxide was passed through two filters in series with intermediate addition (between filters) of hydrogen peroxide to increase its concentration by 0.1 mM. Several passes were made with measurement of absorbence at 272 nm used to estimate disappearance of phenol from solution. Unless stated otherwise additional hydrogen peroxide was not added to the batch before the first filter of the next pass.

| Pass | Remaining Phenol, mM | % Clearance |
|---|---|---|
| 0 | 1.136 | 0 |
| 1 | 0.905 | 20.4 |
| 2 | 0.681 | 40.1 |
| 3 | 0.517 | 54.5 |
| 4 | 0.388 | 65.8 |
| 5* | 0.296 | 74.0 |
| 6* | 0.259 | 77.2 |
| 7 | 0.196 | 82.8 |
| 8* | 0.146 | 87.1 |

*no intermediate addition of peroxide

Example 2

The above experiment was repeated but with approximately 10-fold lower phenol concentration and 10-fold lower hydrogen concentration (10 μM) in the starting solution and at the intermediate addition stages.

| Pass | Remaining Phenol, mM | % Clearance |
|---|---|---|
| 0 | 0.105 | 0 |
| 1 | 0.084 | 20.2 |
| 2 | 0.067 | 35.7 |
| 3 | 0.052 | 50.1 |
| 4* | 0.043 | 59.1 |
| 5* | 0.040 | 61.9 |
| 6# | 0.025 | 76.6 |
| 7 | 0.012 | 88.4 |
| 8* | 0.008 | 92.4 |

*no intermediate addition of peroxide
peroxide increased by 20 μM before first disk and by 10 μM at intermediate stage The two enzyme disks showed 64 and 74% of their original activity after this experiment.

Example 3

A variation of the experiment of Example 2 had the first pass as above but with the second pass peroxide was increased by 100 μM before both disks and no peroxide was added for the third pass.

| Pass | Remaining Phenol, mM | % Clearance |
|---|---|---|
| 0 | 0.075 | 0 |
| 1 | 0.052 | 30.9 |
| 2 | 0.015 | 80.3 |
| 3 | 0 | 100 |

Both filters retained all of their original activity. In all of the foregoing runs precipitated material collected directly on the disks.

Example 4

Naphthalene Clearance in the Presence of Phenol

An experiment was carried out as in Example 1 except that phenol at 1.0 mM and naphthalene at 0.44 mM were present. In order to get the latter into solution at that level, ethanol at 10% v/v was used as cosolvent. Hydrogen peroxide was present at 0.1 mM in the initial solution and was increased by 0.1 mM by intermediate addition between filters at each pass. Naphthalene clearance was estimated from the decrease in absorbence at 312 nm.

| Pass | Remaining Phenol, mM | Remaining Naphth, mM | % Clearance of Naphth |
|---|---|---|---|
| 0 | 1.0 | 0.440 | 0 |
| 1 | * | 0.180 | 59 |
| 2 | * | 0.075 | 83 |
| 3 | * | 0.040 | 91 |
| 4 | 0.52 | 0 | 100 |

*not estimated due to naphthalene contribution to absorbence at 272 nm.

Example 5

An experiment was carried out as in Example 4 but with 0.1 mM phenol plus 0.4 mM naphthalene with peroxide present in the initial solution at 10 μM and its concentration augmented by 10 μM through intermediate addition at each pass. Ethanol was used as cosolvent at 5% v/v.

| Pass | Remaining Phenol, mM | Remaining Naphth, mM | % Clearance of Naphth |
|---|---|---|---|
| 0 | 0.100 | 0.400 | 0 |
| 1 | * | 0.068 | 83 |
| 2 | * | 0.011 | 97 |
| 3 | 0.082 | 0 | 100 |
| 4 | 0.045 | 0 | 100 |

*not estimated due to naphthalene contribution to absorbence at 272 nm.

A control experiment as above but with only phenol showed 48% clearance after 3 passes in absence of ethanol compared to 32% in the presence of ethanol at 5% v/v.

As can be seen, the process of the present invention provides clearance of phenolic compounds from aqueous solution alone or along with another aromatic compound such as naphthalene. Equivalent results can be achieved with other aromatic compounds.

It is intended that the foregoing description be only illustrative of the present invention and that the present invention be limited only by the hereinafter appended claims.

I claim:

1. In the process of removing an aromatic organic compound from an aqueous solution by providing an enzyme and a substrate for said enzyme in the aqueous solution to cause the aromatic organic compound to form a precipitate and optionally by adding a hydroxy- or amine-substituted aromatic compound to the aqueous solution to enhance formation of the precipitate of the aromatic organic compound, the improvement which comprises providing the enzyme immobilized on a surface in the solution, wherein the enzyme is linked to the surface by a precursor to a linking molecule which reacts with the enzyme to immobilize the enzyme.

2. The process of claim 1 wherein said enzyme is a peroxidase and said substrate is a peroxide.

3. A process of enhancing the removal of a multiplicity of organic substances including an aromatic substance from an aqueous solution, including adding at least one enzyme and at least one substrate to said solution, thereby catalyzing the formation of an insoluble precipitate of said multiplicity of organic substances, wherein the precipitation of said aromatic substance is optionally enhanced by the addition of at least one other organic substance comprising a hydroxy- or amine-substituted aromatic compound, and removing said precipitate from said aqueous solution, the improvement which comprises providing the enzyme immobilized on a surface in the solution, wherein the enzyme is linked to the surface by a precursor to a linking molecule which reacts with the enzyme to immobilize the enzyme.

4. The method of claim 3 wherein the formation of said insoluble precipitate is catalyzed by the formation of free radicals on at least one of said organic substances.

5. The method of claim 3 wherein said enzyme comprises peroxidase and said substrate comprises a peroxide.

6. The method of claim 5 wherein the peroxide is hydrogen peroxide.

7. A process for precipitating an aromatic compound from an aqueous solution which comprises:
   (a) providing an aqueous solution containing an aromatic compound and a substrate for an enzyme; and
   (b) contacting the aqueous solution with the enzyme which is immobilized on a surface to cause precipitation of the aromatic compound from the solution, wherein the enzyme is linked to the surface by a precursor to a linking molecule which reacts with the enzyme to immobilize the enzyme.

8. A process for precipitating an aromatic compound from an aqueous solution which comprises:
   (a) providing an aqueous solution containing an aromatic compound and a substrate for an enzyme, wherein the aromatic compound contains at least one substituent in an aromatic ring selected from —NH and —OH; and
   (b) contacting the aqueous solution in a flowing stream with the enzyme which is immobilized on a surface to cause precipitation of the aromatic compound from the solution, wherein the enzyme is linked to the surface by a precursor to a linking molecule which reacts with the enzyme to immobilize the enzyme.

9. The process of claim 8 wherein the enzyme is peroxidase.

10. The process of claim 8 wherein the aqueous solution is at a temperature between about −10° C. to 95° C.

11. The process of claim 8 wherein the surface on which the enzyme is immobilized is a filter paper.

12. The process of claim 8 wherein the enzyme is immobilized on the surface through the precursor to the linking molecule having functional groups selected from the group consisting of amide, ester, ether, thioether, amine, imine and diazo groups which react with the enzyme to immobilize the enzyme.

13. The process of claim 12 wherein the precursor of the linking molecule is adipic acid dihydrazide which reacts with the surface and with the enzyme to provide the linking molecule.

14. The process of claim 13 wherein the surface is a filter and wherein the precipitated reaction product is filtered from the solution during contact with the enzyme immobilized on the surface.

15. The process of claim 8 wherein hydrogen peroxide is provided in the solution as a substrate for the peroxidatic enzyme.

16. The process of claim 15 wherein the enzyme is immobilized on the surface through the precursor to the linking molecule having functional groups selected from the group consisting of amide, ester, ether, thioether, amine, imine and diazo groups which react with the enzyme to immobilize the enzyme.

17. The process of claim 16 wherein the precursor of the linking molecule is adipic acid dihydrazide which reacts with the surface to provide a linking molecule for immobilizing the enzyme on the surface.

18. The process of claim 17 wherein the surface is a filter and wherein the precipitated reaction product is filtered from the solution after contact with the enzyme immobilized on the surface.

19. The process of claim 8 wherein the aromatic compound is a phenolic compound.

20. The process of claim 19 wherein the aromatic compound is phenol.

21. The process of claim 19 wherein the aromatic compound is phenol in admixture with naphthalene.

22. The process of claim 8 wherein the aromatic compound is an aromatic amine.

23. The process of claim 22 wherein the aromatic amine is aniline.

24. In a process for removing a first aromatic organic compound from an aqueous solution, the steps of:
   (a) adding a second aromatic organic compound to said aqueous solution, said second aromatic organic compound comprising a hydroxy- or amine-substituted aromatic compound;
   (b) providing an oxidative enzyme in said aqueous solution immobilized on a surface wherein the enzyme is linked to the surface by a precursor to a linking molecule which reacts with the enzyme to immobilize the enzyme;
   (c) adding a substrate for said enzyme to said aqueous solution;
   (d) allowing sufficient time for said first and second organic compounds to form a precipitate; and
   (e) removing said precipitate from said aqueous solution.

25. The improvement of claim 24 wherein said enzyme is a peroxidase.

26. The process of claim 25 wherein said substrate is hydrogen peroxide.

27. The process of claim 26 wherein said second organic compound comprises a phenol and the first aromatic compound is naphthalene.

28. The process of claim 27 wherein said second organic compound comprises an aromatic amine.

* * * * *

UNITED STATES PATENT AND TRADEMARK OFFICE
CERTIFICATE OF CORRECTION

PATENT NO. : 5,051,184
DATED : September 24, 1991
INVENTOR(S) : Keith E. Taylor

It is certified that error appears in the above—identified patent and that said Letters Patent is hereby corrected as shown below:

Title page, column 2, line 8, "Klivanov" should be --Klibanov--.

Column 5, first structure " 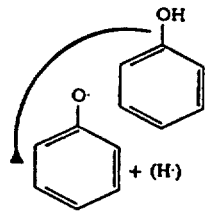 "

should be -- 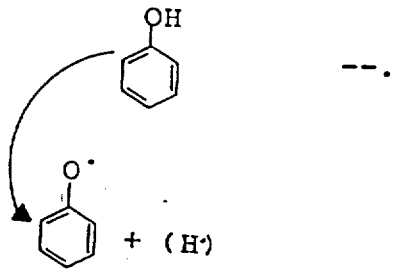 --.

UNITED STATES PATENT AND TRADEMARK OFFICE
CERTIFICATE OF CORRECTION

PATENT NO. : 5,051,184
DATED : September 24, 1991
INVENTOR(S) : Keith E. Taylor

It is certified that error appears in the above—identified patent and that said Letters Patent is hereby corrected as shown below:

Column 5, second structure, " 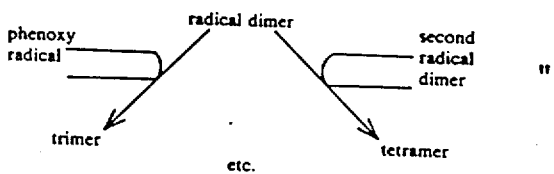 "

should be -- 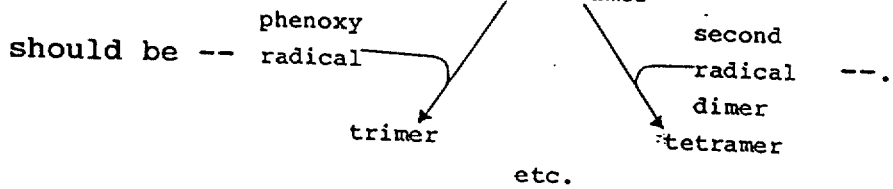 --.

UNITED STATES PATENT AND TRADEMARK OFFICE
CERTIFICATE OF CORRECTION

PATENT NO. : 5,051,184
DATED : September 24, 1991
INVENTOR(S) : Keith E. Taylor

It is certified that error appears in the above-identified patent and that said Letters Patent is hereby corrected as shown below:

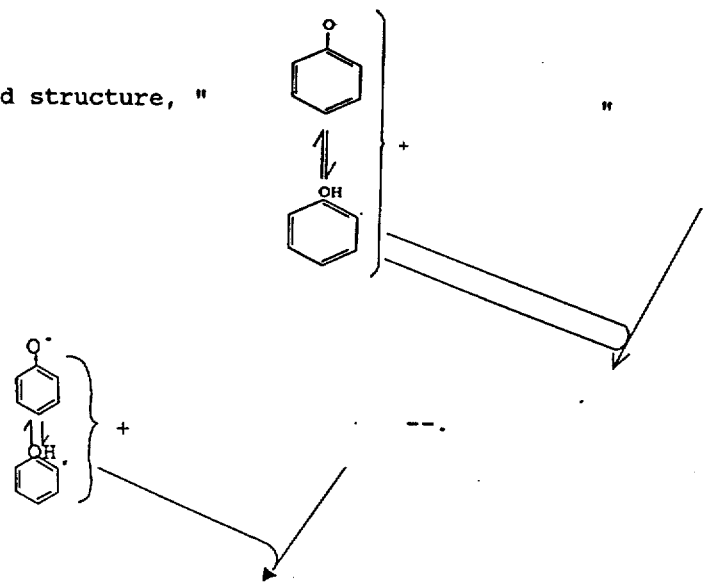

Signed and Sealed this

Ninth Day of February, 1993

Attest:

STEPHEN G. KUNIN

*Attesting Officer*   Acting Commissioner of Patents and Trademarks